(12) United States Patent
Lee et al.

(10) Patent No.: US 8,672,343 B2
(45) Date of Patent: Mar. 18, 2014

(54) MOUNTING APPARATUS OF SIDE AIRBAG FOR VEHICLE

(75) Inventors: Tae Hoon Lee, Hwaseong-si (KR); Sang Do Park, Ansan-si (KR); Hak Gyun Kim, Suwon-si (KR); Chang Oan Woo, Hwaseong-si (KR); Ki Nam Kim, Suwon-si (KR); Sang Nyeong Yun, Suwon-si (KR)

(73) Assignees: Hyundai Motor Company, Seoul (KR); Faurecia Automotive Seating Korea Limited, Suwon-Si (KR)

( * ) Notice: Subject to any disclaimer, the term of this patent is extended or adjusted under 35 U.S.C. 154(b) by 0 days.

(21) Appl. No.: 13/601,095

(22) Filed: Aug. 31, 2012

(65) Prior Publication Data
US 2013/0147243 A1 Jun. 13, 2013

(30) Foreign Application Priority Data
Dec. 12, 2011 (KR) .................. 10-2011-0133208

(51) Int. Cl.
*B60R 21/207* (2006.01)

(52) U.S. Cl.
USPC .................... 280/728.2; 280/730.2

(58) Field of Classification Search
USPC .............. 280/728.2, 730.2, 730.1, 728.3
See application file for complete search history.

(56) References Cited

U.S. PATENT DOCUMENTS 8,353,526 B2 * 1/2013 Ciszek ................. 280/728.2

FOREIGN PATENT DOCUMENTS

| JP | 09132102 A | * | 5/1997 | ............. B60R 21/22 |
| KR | 20-1999-0026011 U | | 7/1999 | |

* cited by examiner

*Primary Examiner* — Keith Frisby
(74) *Attorney, Agent, or Firm* — Morgan, Lewis & Bockius LLP

(57) ABSTRACT

A mounting apparatus of a side airbag for a vehicle is advantageous in that in the event of a side crash, a deployment direction of an airbag cushion is guided to a slit of a seat pad by an inner frame and an outer bracket, so that the airbag cushion is distended and deployed towards a front of a seat back, thus allowing an occupant sitting in a seat to be more safely protected via the deployed airbag cushion.

5 Claims, 4 Drawing Sheets

MOUNTING APPARATUS OF SIDE AIRBAG FOR VEHICLE

CROSS-REFERENCE TO RELATED APPLICATIONS

The present application claims priority of Korean Patent Application Number 10-2011-0133208 filed Dec. 12, 2011, the entire contents of which application is incorporated herein for all purposes by this reference.

BACKGROUND OF INVENTION

1. Field of Invention

The present invention relates generally to a mounting apparatus of a side airbag for a vehicle and, more particularly, to a mounting apparatus of a side airbag for a vehicle, intended to guide a deployment direction of an airbag cushion to the front of a seat.

2. Description of Related Art

Generally, a vehicle is provided with various kinds of airbag apparatuses to protect the safety of occupants. Among them, a side airbag is provided on a side of a seat back 10 as shown in FIG. 1 in order to protect an occupant in the event of a side crash while an airbag cushion 22 is distended and deployed forwards.

As shown in FIG. 2, the side airbag apparatus is configured so that an airbag module 20 having an inflator 21, an airbag cushion 22, etc. is fixedly mounted to a seat back frame 11. The airbag module 20 is surrounded by a seat pad 12, and the seat pad 12 is surrounded by a seat cover 13.

Further, a slit 12a is formed in the seat pad 12 to guide a deployment direction of the airbag cushion 22 and thereby allow the airbag cushion 22 to be distended and deployed forwards.

Usually, the seat back frame 11 to which the airbag module 20 is attached is mostly manufactured of steel. However, in order to achieve lightness, high fuel efficiency and a reduction in cost, recently, the trend to use a plastic seat back frame has been gaining.

Thus, when a side crash takes place, the airbag cushion 22 should cut the slit 12a of the seat pad 12 and the seat cover 13 and then be deployed and distended to the front of the seat as shown by a dotted line (M1) of FIG. 2 so as to safely protect an occupant. However, the seat back frame 11 made of plastic as described above lacks rigidity, so that the airbag cushion 22 may be disadvantageously deployed towards an indoor side through a space between the seat back frame 11 and the seat pad 12.

That is, in a side crash, a trim panel of a door may be thrust into the indoor side and press the side of the seat. When such a situation occurs, the space in which the airbag cushion 22 is deployed is insufficient, so that the deployment direction of the airbag cushion 22 is not guided to the slit 12a of the seat pad 12 but is guided to the indoor side. Consequently, the airbag cushion 22 may be undesirably deployed to the indoor side through the space between the seat back frame 11 and the seat pad 12 as shown by the dotted line M2 of FIG. 2.

As such, if the airbag cushion 22 is deployed to the indoor side, an occupant sitting in the seat is not sufficiently protected by the airbag cushion 22, thus increasing injuries.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for provide a mounting apparatus of a side airbag for a vehicle, intended to reliably guide a deployment direction of an airbag cushion to a slit formed in a seat pad even when a trim panel of a door is thrust into an indoor side and presses a side of a seat in the event of a side crash, thus enabling the airbag cushion to be correctly deployed while distending to the front of a seat back, thereby better protecting occupants.

Various aspects of the present invention provide for a mounting apparatus of a side airbag for a vehicle, including an inner frame located at an indoor side of an airbag module, and mounted to block a space between a seat pad and a seat back frame, an airbag bracket coupled with the airbag module, and fixedly mounted to the inner frame, and an outer bracket located at an outdoor side of the airbag module, with opposite ends of the outer bracket coming into contact with the inner frame.

The inner frame may be formed to have a U-shaped cross-section that is open towards the outdoor side.

The inner frame may be integrated with the seat back frame in such a way as to be connected to the seat back frame.

The seat back frame and the inner frame may be manufactured of plastic.

The airbag module may be obliquely coupled to the airbag bracket in such a way that an end of the airbag cushion faces a slit formed in the seat pad.

An end of the inner frame and an end of the outer bracket may be formed to extend to the slit formed in the seat pad.

One of the inner frame and the airbag bracket may be integrally provided with a locking protrusion, and a remaining one may be integrally provided with a locking hole to enable insertion of the locking protrusion therein.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
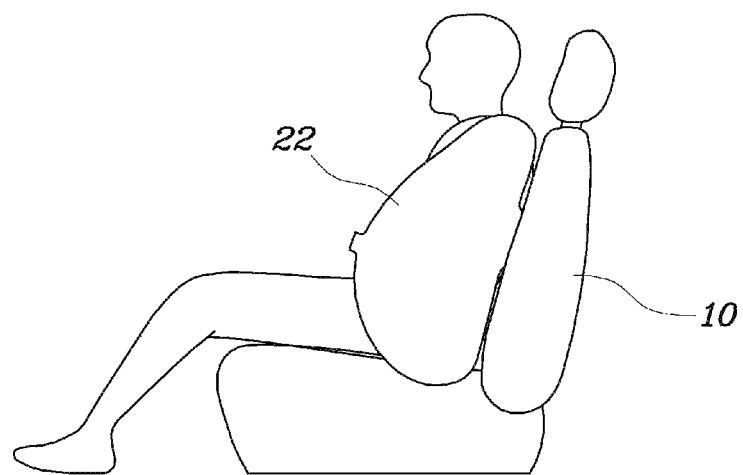
FIG. 1 is a view illustrating an exemplary side airbag apparatus for a vehicle.
Figure 2:
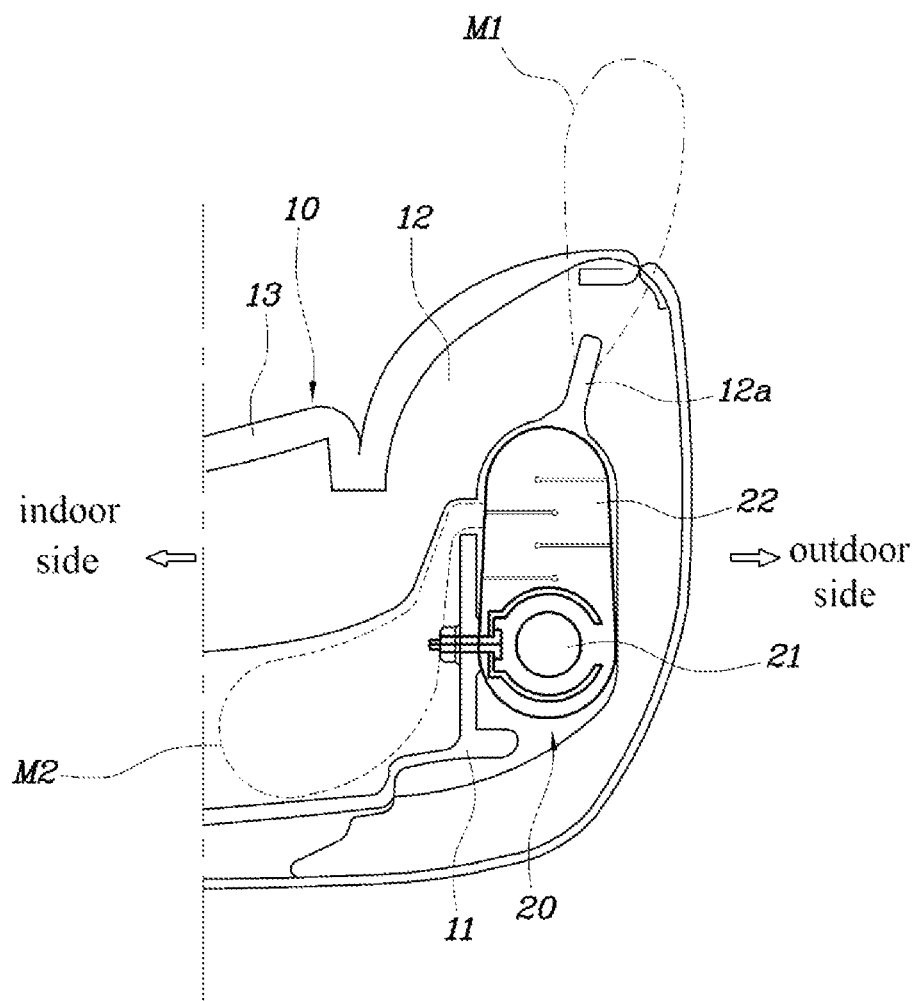
FIG. 2 is a view illustrating a conventional side airbag apparatus for a vehicle.
Figure 3:
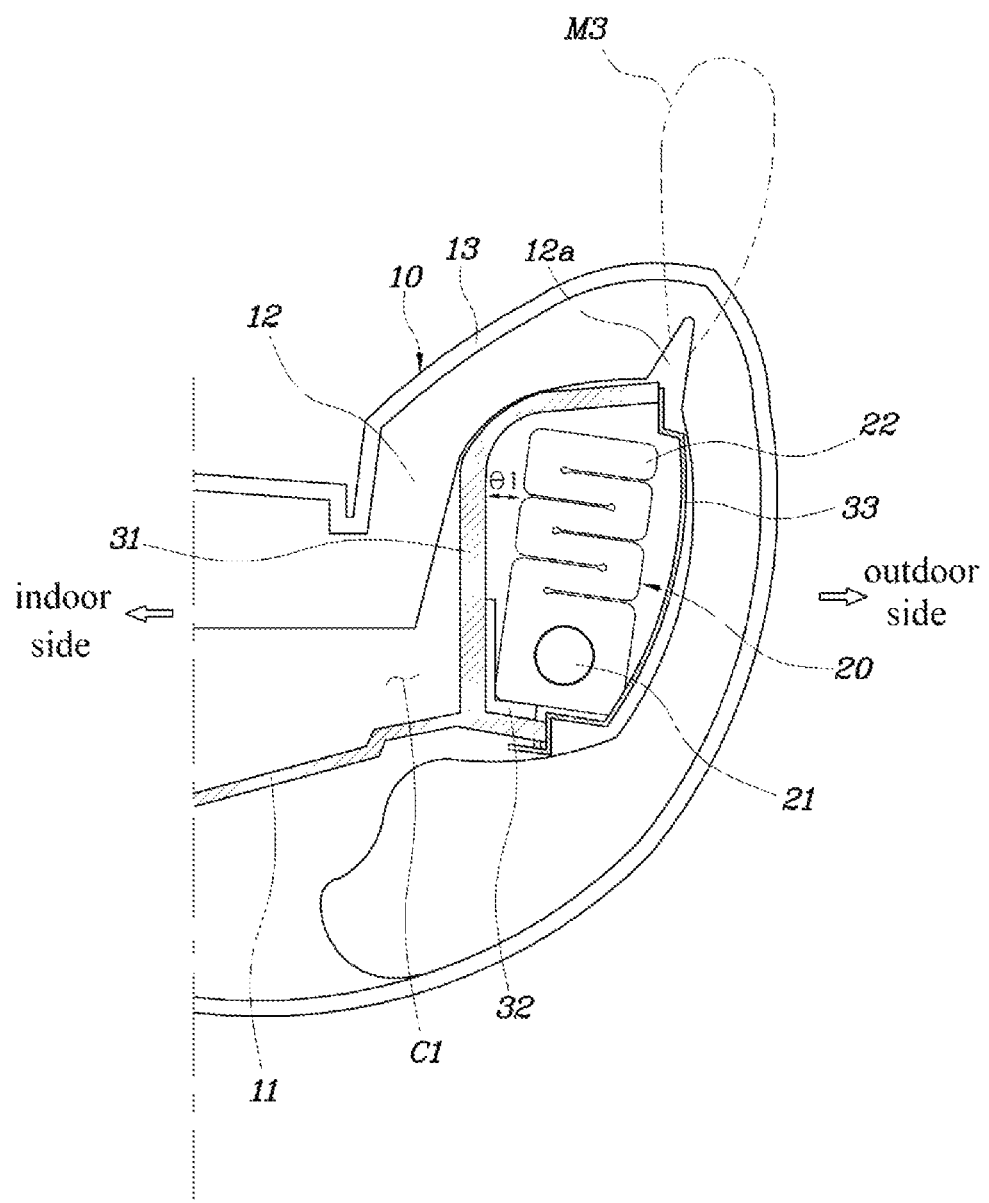
FIGS. 3 and 4 are views illustrating a mounting apparatus of an exemplary side airbag for a vehicle in accordance with the present invention.

As shown in FIG. 3, a side airbag apparatus for a vehicle is configured so that an airbag module 20 having an inflator 21, an airbag cushion 22, etc. is fixedly mounted to a seat back frame 11 on a side of a seat back 10. The airbag module 20 is surrounded by a seat pad 12, and the seat pad 12 is surrounded by a seat cover 13.

Further, a slit 12a is formed in the seat pad 12 and guides a deployment direction of the airbag cushion 22 to deploy the airbag cushion 22 while distending it forwards.

Meanwhile, the mounting apparatus of the side airbag for the vehicle according to the present invention includes an inner frame 31, an airbag bracket 32, and an outer bracket 33. The inner frame 31 is installed at a location on an indoor side or inward side of the airbag module 20, that is, on a side of the airbag module that is away from an adjacent vehicle door or window, and blocks a space between the seat pad 12 and the seat back frame 11. The airbag bracket 32 is coupled with the airbag module 20, and is fixedly mounted to the inner frame 31. The outer bracket 33 is installed on a location on an outdoor side of the airbag module 20 and comes into contact with the inner frame 31 at opposite ends thereof.

Here, the inner frame 31 is formed to have a U-shaped cross-section that is open towards the outdoor side. Because of the U-shaped cross-section, the airbag cushion 22 is not deployed to a space C1 between the seat pad 12 and the seat back frame 11, but is guided to be deployed to the slit 12a of the seat pad 12.

The inner frame 31 may be integrated with the seat back frame 11 in such a way as to be connected to the seat back frame 11. Particularly, the seat back frame 11 and the inner frame 31 are may be made of plastic to achieve lightness, compactness, high fuel efficiency and a reduction in cost.

Figure 4:
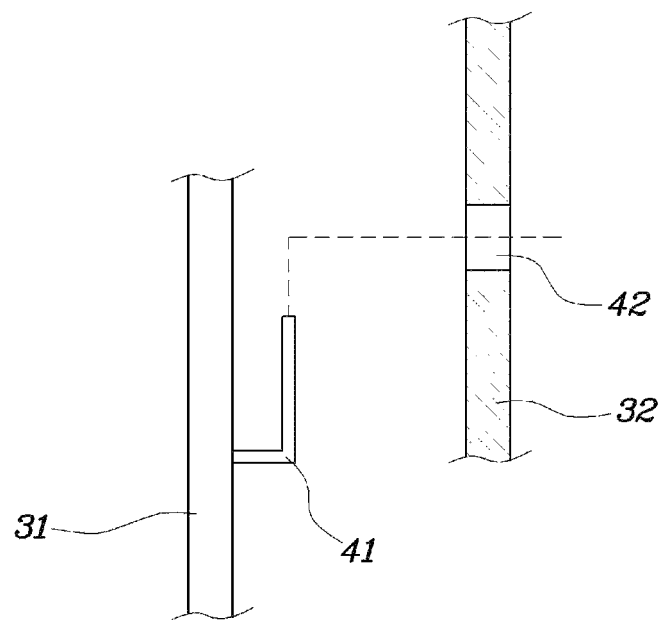

As such, when the airbag bracket 32 coupled with the airbag module 20 is coupled to the inner frame 31 made of plastic, a minimum number of bolts and nuts are used. In addition, in order to maintain coupling strength between the parts, the present invention is configured, as shown in FIG. 4, so that a locking protrusion 41 is integrally provided on one of the inner frame 31 and the airbag bracket 32, and a locking hole 42 is integrally formed in a remaining one to insert the locking protrusion 41 therein. One will appreciate that in various embodiments, the locking protrusion may be monolithically formed with the inner frame or the air bag bracket.

That is, a bolt and a nut are used to fasten the inner frame 31 to a lower portion of the airbag bracket 32 on which the inflator 21 is disposed because the coupling force that holds this portion should be large. Further, the coupling of an upper portion of the airbag bracket 32 spaced apart from the inflator 21 is carried out using the locking protrusion 41 and the locking hole 42.

In various embodiments, when the inner frame 31 is manufactured using plastic resin, the locking protrusion 41 may be integrated with the inner frame 31 by performing insert injection molding using a steel bracket, and the locking hole 42 is formed in the airbag bracket 32 in the shape of a hole.

The locking protrusion 41 and the locking hole 42 are advantageous in that they can eliminate rattle noise of the airbag module 20 when the seat vibrates, and moreover they can disperse stress in the event of a side crash.

The airbag module 20 may be obliquely coupled to the airbag bracket 32 in such a way that an end of the airbag cushion 22 faces the slit 12a formed in the seat pad 12. This enables the deployment direction of the airbag cushion 22 to be guided to the slit 12a of the seat pad 12.

A mounting inclination angle θ1 of the airbag module 20 may be 6°~8°, but is not limited thereto.

Further, one end of the inner frame 31 and one end of the outer bracket 33 extend to the slit 12a formed in the seat pad 12. This enables the deployment direction of the airbag cushion 22 to be more precisely guided to the slit 12a.

Hereinafter, an operation of the apparatus according to the present invention will be described.

When a side crash occurs, if the inflator 21 is exploded to generate gas in the response of a control signal of an airbag ECU, deployment of the airbag cushion 22 begins while it is being inflated by gas pressure.

At this time, the deployed airbag cushion 22 is blocked by the inner frame 31, so that the airbag cushion 22 does not deploy towards the indoor side through the space C1 between the seat back frame 11 and the seat pad 12, and the deployment direction of the airbag cushion 22 is instead guided to the slit 12a of the seat pad 12 by the inner frame 31 and the outer bracket 33.

As such, the deployment direction of the airbag cushion 22 is guided to the slit 12a of the seat pad 12 by the inner frame 31 and the outer bracket 33, so that the slit 12a of the seat pad 12 and the seat cover 13 positioned in front of the seat pad are cut by deployment pressure of the airbag cushion 22, and the airbag cushion 22 is deployed through a cut gap while distending towards the front of the seat back 10 (the state M3 shown by the dotted line of FIG. 3).

Therefore, an occupant can be protected more safely by the airbag cushion 22 deployed towards the front of the seat back 10.

Meanwhile, if the trim panel of the door is thrust into the indoor side because of the side crash and thus presses the side of the seat, there is a shortage of space in which the airbag cushion 22 can be deployed. Thereby, the deployed airbag cushion 22 may be guided towards the space C1 between the seat back frame 11 and the seat pad 12.

However, according to the present invention, the inner frame 31 blocks the space C1 between the seat back frame 11 and the seat pad 12, so that the airbag cushion 22 is not deployed towards the space C1 between the seat back frame 11 and the seat pad 12. Consequently, the deployment direction of the airbag cushion 22 is guided towards the slit 12a of the seat pad 12 by the inner frame 31 and the outer bracket 33. Thus, deployment of the airbag cushion 22 is more predictable while distending towards the front of the seat back 10.

As described above, the present invention provides a mounting apparatus of a side airbag for a vehicle, which is advantageous in that in the event of a side crash, a deployment direction of an airbag cushion is guided to a slit of a seat pad by an inner frame and an outer bracket, so that the airbag cushion is distended and deployed towards a front of a seat back, thus allowing an occupant sitting in a seat to be more safely protected via the deployed airbag cushion.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting apparatus of a side airbag for a vehicle, comprising:
   an inner frame located at an inward side of an airbag module, and mounted to block a space between a seat pad and a seat back frame;
   an airbag bracket coupled with the airbag module, and fixedly mounted to the inner frame; and
   an outer bracket located at an outdoor side of the airbag module, with opposite ends of the outer bracket coming into contact with the inner frame,
   wherein the airbag module is obliquely coupled to the airbag bracket in such a way that an end of an airbag cushion faces a slit formed in the seat pad, and
   wherein one of the inner frame and the airbag bracket is monolithically provided with a locking protrusion, and the other of the inner frame and the airbag bracket is integrally provided with a locking hole to receive the locking protrusion therein.

2. The mounting apparatus as set forth in claim 1, wherein the inner frame includes a U-shaped cross-section that is open towards the outdoor side.

3. The mounting apparatus as set forth in claim 2, wherein the inner frame is integrated with the seat back frame in such a way as to be connected to the seat back frame.

4. The mounting apparatus as set forth in claim 1, wherein the seat back frame and the inner frame are manufactured of plastic.

5. The mounting apparatus as set forth in claim 1, wherein an end of the inner frame and an end of the outer bracket extend to the slit formed in the seat pad.

* * * * *